Nov. 28, 1950  R. B. DRESCHER ET AL  2,532,153

CONTROL APPARATUS

Filed March 1, 1945

Inventors:
Alfred E. Wenzel
and Rowland B. Drescher,
By Dawson, Ooms & Booth,
Attorneys.

Patented Nov. 28, 1950

2,532,153

UNITED STATES PATENT OFFICE 2,532,153

CONTROL APPARATUS

Rowland B. Drescher and Alfred C. Wenzel, Chicago, Ill., assignors to Republic Flow Meters Company, Chicago, Ill., a corporation of Illinois Application March 1, 1945, Serial No. 580,422

10 Claims. (Cl. 137—139)

This invention relates to control apparatus and more particularly to apparatus for regulating valves or the like to control flow pressure or other similar conditions.

In many control applications, valves are used which seat against rubber or like resilient seats to obtain fluid tight seals. In order to seat and unseat such valves a large force is required to press them into their resilient seats although in intermediate control positions, the valves may be moved with a relatively small force. It has heretofore been necessary to employ large motors to seat and unseat the valves and in the intermediate control positions of the valve such motors being oversize caused a waste of power and a slower valve movement than is desirable.

It is one of the objects of the present invention to provide a control apparatus which produces a large valve seating and unseating force and which supplies less force to move the valve through its intermediate control positions.

Another object is to provide control apparatus in which one motor operates the valve throughout its intermediate positions and a second motor acts on the valve only during seating and unseating thereof. Preferably the second motor is connected to the valve through a force multiplying mechanism producing extremely large seating and unseating pressures on the valve.

Still another object is to provide control mechanism in which two motors are controlled to operate successively so that one helps the other during only a selected portion of its movement.

The above and other objects and advantages of the invention will be more readily apparent from the following description when read in connection with the accompanying drawing, in which—

Figure 1:
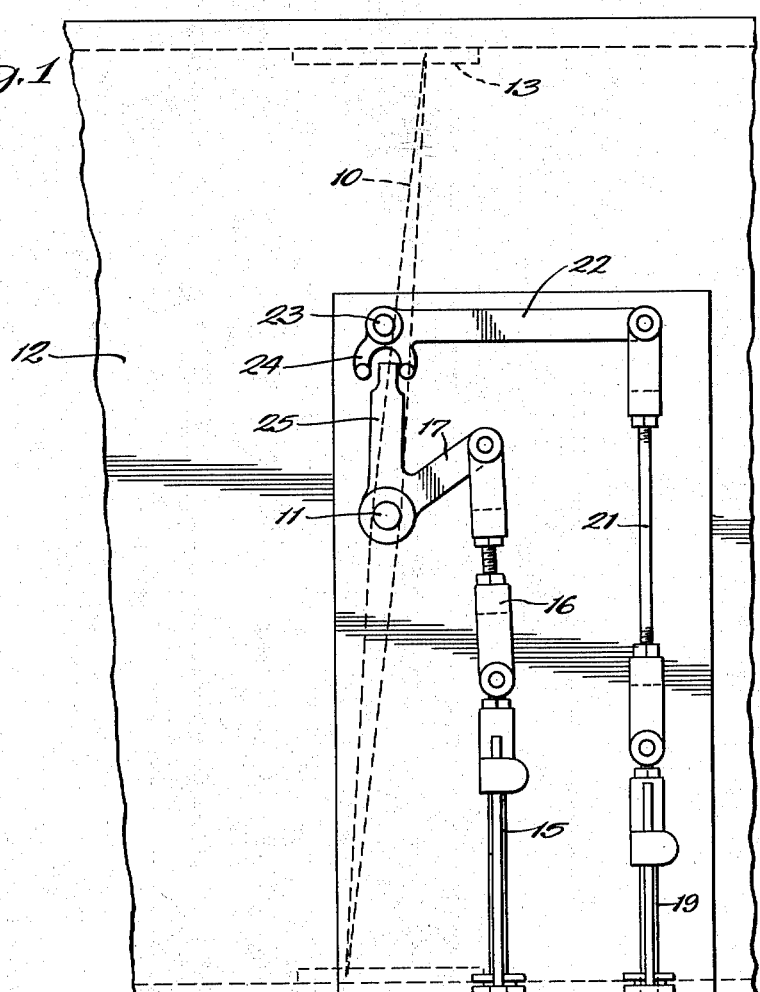
Figure 2:
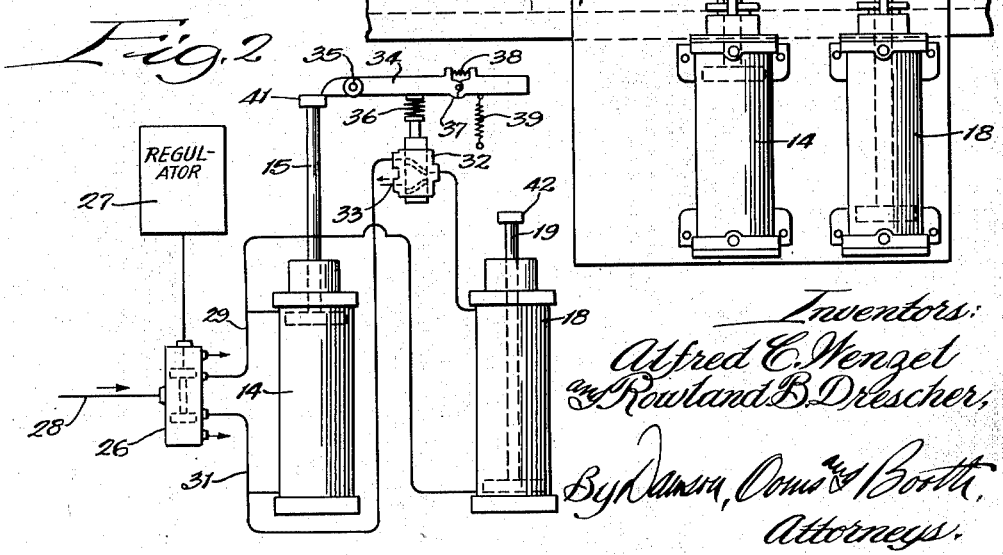

Figure 1 is a diagrammatic side view of a control apparatus embodying the invention and operating a butterfly type valve and Figure 2 is a diagram of the control system for the motors of Figure 1.

As shown in Figure 1 the invention is applied to the control of a large butterfly valve 10 pivoted on a shaft 11 in a conduit 12 in which the pressure flow or the like is to be controlled. The conduit 12 carries an annular seat 13 which may be of rubber or like resilient material and against which the edges of the valve 10 seat to close the conduit tightly. It will be appreciated that to press the edges of the valve firmly against the resilient seat 13 a large force is required and a corresponding force is required to move the valve away from the seat due to the flow of the resilient material.

The valve is moved through its full range of movement by a fluid motor comprising a cylinder 14 mounted adjacent the conduit having a piston slidable therein whose piston rod 15 is pivotally connected through an adjustable link 16 to one end of an arm 17 rigidly secured to the valve shaft 11. The motor 14 may be made of relatively small size to supply only sufficient power to move the valve through its intermediate control range and insufficient to force the valve into the seat 13.

In order to supply additional seating and unseating force a second motor 18 is provided including a cylinder having a piston therein whose piston rod 19 is connected through an adjustable link 21 to one end of a lever 22 pivoted at 23. The opposite end of the lever is yoked as indicated at 24 to receive one end of a second arm 25 which is rigidly connected to the valve shaft 11. It will be noted that the lever 22, the yoke mechanism 24 and the arm 25 provide a large mechanical advantage for the motor 18 so that a relatively small motor can exert an extremely large turning force on the valve shaft 11.

The motors are controlled as indicated in Figure 2 by a pilot valve 26 which is controlled in any desired manner as for example, by a regulator 27 responsive to the condition in the pipe 12. The pilot valve is connected to a supply of actuating fluid, such as air under pressure through a pipe 28 and to the opposite ends of the motors 14 and 18 through pipes 29 and 31. It will be noted that the connections to the motors 14 and 18 are crossed so that as the piston rod 15 is moved upwardly the piston rod 19 will be moved downwardly and vice versa.

A three-way valve 32 is connected in the pipe 31 between the upper end of motor 18 and the pilot valve and is movable to one position as shown in which it establishes communication through the pipe and to a second position in which it vents the upper end of the motor 18 through an exhaust port 33. The pilot valve is controlled by a lever 34 pivoted at 35 and connected to the pilot valve through a spring 36. The spring 36 is provided to prevent damage to the pilot valve in the event of excessive movement of the lever.

The lever is formed intermediate its ends with a break-away mechanism shown as a pivotal connection with a stop 37 to limit pivotal movement in one direction and a spring 38 to urge the two parts of the lever against the stop. With this mechanism when both ends of the lever are moved upwardly, the spring 28 will yield to permit bending of the lever. The lever is normally urged clockwise about its pivot to the position shown by a spring 39.

The valve 32 is controlled by operation of the motors 14 and 18 and for this purpose the piston rod 15 is provided with a projection 41 to engage the left end of the lever while the piston rod 19 has a projection 42 to engage the right end of the lever. When the piston rod 15 is elevated as shown in Figure 2 it will tilt the lever 34 clockwise to move the pilot valve down to establish communication through the pipe 31. When the piston rod 19 is elevated, it will engage the right end of the lever to tilt it counter-clockwise and raise the pilot valve to vent the upper end of the motor 18.

The parts are shown in Figures 1 and 2 with the valve 10 in its closed position. The piston rod 15 at this time is raised while the piston rod 19 is lowered so that the yoke 24 engages the arm 25 to exert a large closing pressure on the valve. To open the valve the pilot valve 26 will be raised to connect the inlet 28 through the pipe 29 to the upper end of the cylinder 14 and the lower end of the cylinder 18. The upper end of the cylinder 18 will be connected through the valve 32 and pipe 31 to exhaust and the lower end of the cylinder 14 will be connected directly through the pipe 31 and pilot valve 26 to exhaust. At this time the lever 22 will be turned counter-clockwise to urge the arm 25 clockwise with a large force tending to open the valve. By the time the valve has moved away from its seat, the yoke 24 will be tilted to a position where the arm 25 can move freely away from it and at this time the piston rod 19 will have reached substantially the upper limit of its travel and the piston rod 15 will have moved down slightly. In this position the piston rod 19 will engage the right end of the lever 34 and will raise the valve 32 so that the upper end of the cylinder 18 will be vented. The piston rod 19 will, therefore, be held in its extreme upper position by pressure in the lower part of cylinder 18 until the valve 32 and the pilot valve 26 are reversed.

In this position of the parts, the valve 10 is under the sole control of the motor 14 which is of ample size to move it through its intermediate control ranges rapidly and efficiently.

When the valve is to be closed, the pilot valve 26 will be shifted up to connect the pressure line 28 to the lower end of the cylinder 14. It will be noted at this time that the valve 32 blocks the line 31 ahead of the upper end of cylinder 18 so that this cylinder is not affected. The piston rod 15 will, therefore, travel upwardly turning the valve 10 toward its closed position until the projection 41 strikes the left end of the lever 34 and moves the valve 32 down to the position shown. During this latter operation the breakaway yields to permit the valve 32 to be moved even though the piston rod 19 remains in its uppermost position. At this time the valve 10 is substantially against its seat and the valve 32 connects the pipe 31 to the upper end of the cylinder 18 to supply fluid thereto. The piston rod 19, therefore, begins to move downwardly to rock the lever 22 clockwise so that the yoke 24 will engage the arm 25 and exert a large closing force thereon.

While one embodiment of the invention has been shown and described in detail herein, it will be understood that this is illustrative only and is not intended as definition of the scope of the invention, reference being had for this purpose to the appended claims.

What is claimed is:

1. Control apparatus for a valve or the like comprising a first motor operatively connected to the valve to move it in response to movement of the motor, a second motor, means moved by the second motor operatively engageable with the valve only when it is near its closed position, control means for the motors, and supplemental control means for the second motor operated by the first motor when it is near its valve closing position.

2. Control apparatus for a valve or the like comprising a first motor operatively connected to the valve to move it in response to movement of the motor, a second motor, a lever moved by the second motor having a yoked end, an operating arm for the valve adapted to fit in the yoked end when the valve is in substantially closed position whereby the second motor acts on the valve only during its final closing and initial opening movements, control means for the motors, and supplemental control means for the second motor to prevent it from being energized in a valve closing direction until the valve has reached a substantially closed position.

3. Control apparatus for a valve or the like comprising a first fluid motor operatively connected to the valve to move it substantially from closed to open position, a second fluid motor, means operatively connecting the second fluid motor to the valve only during final closing and initial opening movement thereof, control means for controlling supply and exhaust of operating fluid to the motors, and a supplemental control valve for the second fluid motor operated by the first fluid motor during final valve closing and initial valve opening movement.

4. Control apparatus for a valve or the like comprising a first fluid motor operatively connected to the valve to move it substantially from closed to open position, a second fluid motor, means operatively connecting the second fluid motor to the valve only during final closing and initial opening movement thereof, control means for controlling supply and exhaust of operating fluid to the motors, a valve alternately to connect one end of the second fluid motor to the control means or to exhaust, a pivoted beam controlling the valve, the first motor moving the beam to a position to connect the second motor to the control means when the first motor is substantially in its valve closing position, and the second motor moving the beam to connect the second motor to exhaust when the second motor is in its valve opening position.

5. Control apparatus for a valve or the like comprising a first fluid motor operatively connected to the valve to move it substantially from closed to open position, a second fluid motor, means operatively connecting the second fluid motor to the valve only during final closing and initial opening movement thereof, control means for controlling supply and exhaust of operating fluid to the motors, a valve alternately to connect one end of the second fluid motor to the control means or to exhaust, a pivoted beam controlling the valve, the first motor moving the beam to a position to connect the second motor to the control means when the first motor is substantially in its valve closing position, and the second motor moving the beam to connect the second motor to exhaust when the second motor is in its valve opening position, and a yielding connection in the beam whereby it can yield when the motors tend to urge it in opposite directions.

6. In combination with a valve having a resilient seat, control apparatus comprising a motor operatively connected to the valve, a second motor, a pivoted lever connected to the second motor and having a yoked end, an operating arm for the valve engageable with the yoked end when the valve is near its closed position whereby the second motor is effective to move the valve only during its final closing and initial opening movements, and control means for the motors.

7. In combination with a valve having a resilient seat, control apparatus comprising a motor operatively connected to the valve, a second motor, a pivoted lever connected to the second motor and having a yoked end, an operating arm for the valve engageable with the yoked end when the valve is near its closed position whereby the second motor is effective to move the valve only during its final closing and initial opening movements, means to control energizing of the motors, and means to prevent energizing of the second motor until the valve has substantially reached its closed position.

8. In combination with a valve having a resilient seat, control apparatus comprising a first motor operatively connected to the valve to move it substantially from its closed to its open position, a second motor, and force multiplying means connecting the second motor to the valve only when the valve is substantially closed whereby the second motor is effective to apply a large seating and unseating force to the valve.

9. In a control apparatus a pair of fluid motors, a control valve connected to the opposite ends of the motors and adjustable to two positions to control supply of fluid thereto and exhaust of fluid therefrom to cause the motors to move in opposite directions, a three-way valve in one of the connections movable to a first position to establish flow through the connection and to a second position to vent one end of one of the motors, means operated by said one of the motors when it approaches the limit of its movement in response to adjustment of the control valve to one position to move the three-way valve to its second position, and means operated by the other of the motors as it approaches the limit of its travel in response to adjustment of the control valve to its other position to move the three-way valve to its first position.

10. In a control apparatus a pair of fluid motors, a control valve connected to the opposite ends of the motors and adjusted to two positions to control supply of fluid thereto and exhaust of fluid therefrom to cause the motors to move in opposite directions, a three-way valve in one of the connections movable to a first position to establish flow through the connection and to a second position to vent one end of one of the motors, and a pivoted lever connected to the three-way valve to operate it, said one of the motors engaging the lever to move the three-way valve to its second position as the motor approaches the limit of its travel in response to adjustment of the control valve to one position and the other of the motors engaging the lever to move the three-way valve to its first position as the motor approaches the limit of its movement in response to adjustment of the control valve to its other position.

ROWLAND B. DRESCHER.
ALFRED C. WENZEL.

REFERENCES CITED

The following references are of record in the file of this patent:

UNITED STATES PATENTS

| Number | Name | Date |
|---|---|---|
| 2,184,057 | Parker | Dec. 19, 1937 |
| 2,307,544 | Robinson | Jan. 5, 1943 |
| 2,379,536 | Mackenzie | July 3, 1945 |